US009467186B2

(12) United States Patent
Wu et al.

(10) Patent No.: US 9,467,186 B2
(45) Date of Patent: Oct. 11, 2016

(54) CARD HOLDER AND MOBILE TERMINAL INCLUDING SAME

(71) Applicant: Xiaomi Inc., Beijing (CN)

(72) Inventors: Fenghui Wu, Beijing (CN); Kesheng Yan, Beijing (CN); Shasha Shi, Beijing (CN); Shaojie Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 300 days.

(21) Appl. No.: 14/144,765

(22) Filed: Dec. 31, 2013

(65) Prior Publication Data

US 2014/0307401 A1 Oct. 16, 2014

Related U.S. Application Data

(63) Continuation of application No. PCT/CN2013/085925, filed on Oct. 25, 2013.

(30) Foreign Application Priority Data

Apr. 16, 2013 (CN) .......................... 2013 1 0130952

(51) Int. Cl.

*H05K 5/00* (2006.01)
*H04B 1/3816* (2015.01)
*H04M 1/02* (2006.01)

(52) U.S. Cl.

CPC .......... *H04B 1/3816* (2013.01); *H04M 1/0202* (2013.01)

(58) Field of Classification Search

CPC .................................................... H05K 5/0269
USPC ........................................................ 361/737
See application file for complete search history.

(56) References Cited

U.S. PATENT DOCUMENTS

| | | | |
|---|---|---|---|
| 7,731,538 | B2 | 6/2010 | Kiryu et al. |
| 2006/0110958 | A1 | 5/2006 | Shen et al. |
| 2008/0207060 | A1 | 8/2008 | Kiryu et al. |
| 2013/0260830 | A1 | 10/2013 | Zhao et al. |

FOREIGN PATENT DOCUMENTS

| | | |
|---|---|---|
| CN | 202014243 | 10/2011 |
| CN | 102340568 | 2/2012 |
| CN | 102665302 | 9/2012 |
| CN | 103237098 | 8/2013 |
| JP | 08-287197 (A) | 11/1996 |
| JP | 10-028156 (A) | 1/1998 |
| JP | 2007-095356 (A) | 4/2007 |
| JP | 2008218045 (A) | 9/2008 |
| KR | 10-2006-0080776 | 4/2007 |

OTHER PUBLICATIONS

Supplementary European Search Report of EP 13 68 2275, from the European Patent Office, mailed Apr. 21, 2016.

*Primary Examiner* — Forrest M Phillips
(74) *Attorney, Agent, or Firm* — Finnegan, Henderson, Farabow, Garrett & Dunner LLP

(57) ABSTRACT

A card holder for holding a card includes a card holder body for providing a support plane for supporting the card; and a plurality of inlaid pieces, wherein each of the plurality of inlaid pieces is pivotally mounted on the card holder body, and is structured to be rotated to a first position perpendicular to the support plane or a second position not higher than the support plane.

15 Claims, 6 Drawing Sheets

100
14
13
12
15
11

CARD HOLDER AND MOBILE TERMINAL INCLUDING SAME

CROSS-REFERENCE TO RELATED APPLICATIONS

This application is a continuation of International Application No. PCT/CN2013/085925, filed Oct. 25, 2013, which is based on and claims priority to Chinese Patent Application No. 201310130952.0, tiled Apr. 16, 2013, the entire contents of all of which are hereby incorporated by reference.

TECHNICAL FIELD

The present disclosure generally relates to a technical field of communication equipment and, more particularly, to a card holder and a mobile terminal including the card holder.

BACKGROUND

With the improvement of technology, various mobile terminals, such as a mobile phone, a notebook computer, a tablet computer, etc., are developed. For example, the structure, style, and performance of a mobile terminal may be frequently updated.

Conventionally, a card holder for holding a mobile terminal card, such as a subscriber identity module (SIM) card, is provided in the mobile terminal, and can only match cards with the same size. As a result, when a user needs to use a mobil terminal card with a different size, the card holder is unable to hold the card with the different size.

SUMMARY

According to a first aspect of the present disclosure, there is provided a card holder for holding a card, comprising: a card holder body for providing a support plane for supporting the card; and a plurality of inlaid pieces, wherein each of the plurality of inlaid pieces is pivotally mounted on the card holder body, and is structured to be rotated to a first position perpendicular to the support plane or a second position not higher than the support plane.

According to a second aspect of the present disclosure, there is provided a mobile terminal, comprising: a housing; and a card holder in the housing, wherein the card holder includes: a card holder body for providing a support plane for supporting a card; and a plurality of inlaid pieces, wherein each of the plurality of inlaid pieces is pivotally mounted on the card holder body, and is structured to be rotated to a first position perpendicular to the support plane or a second position not higher than the support plane.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION OF THE EMBODIMENTS

Figure 1A:
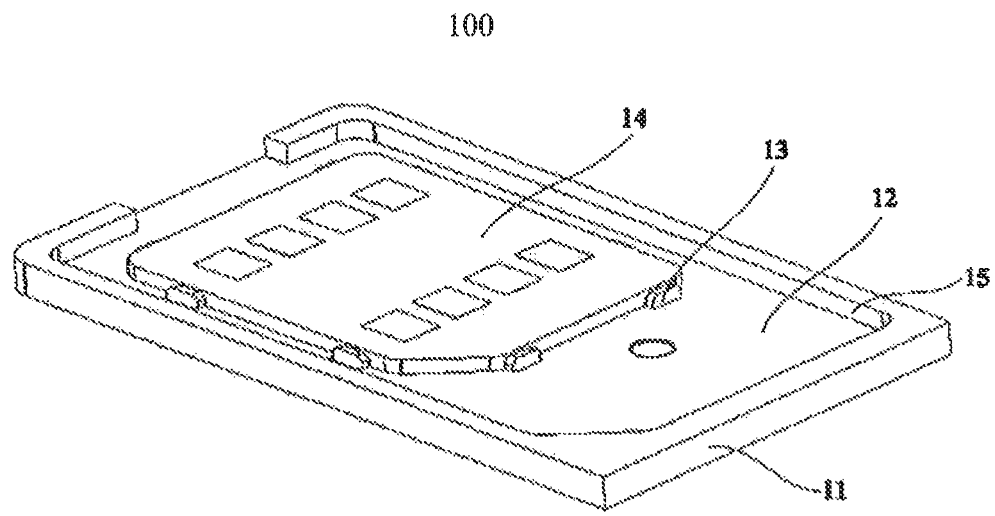
FIGS. 1*a* and 1*b*, 2*a* and 2*b*, and 3*a* and 3*b* show external views of a card holder for use in a mobile terminal, according to exemplary embodiments.
Figure 1B:
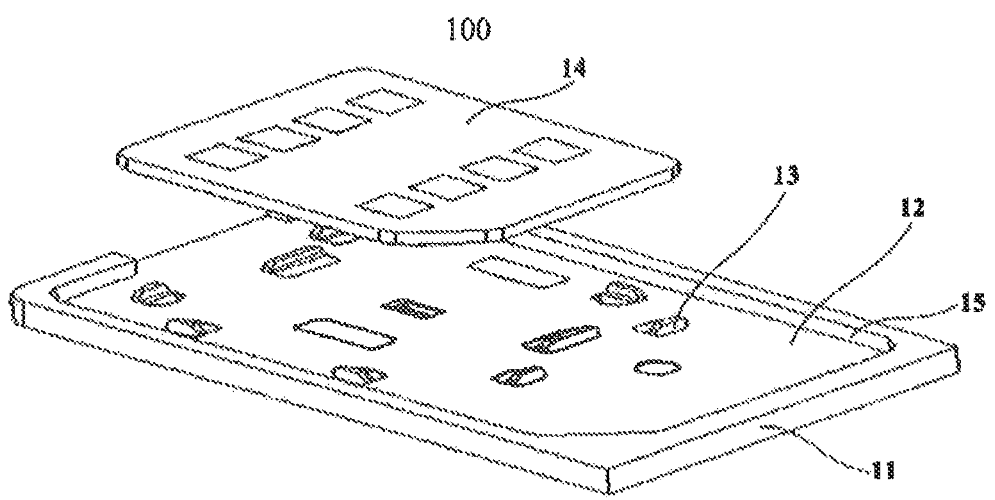

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In exemplary embodiments, there is provided a card holder for use in a mobile terminal, such as a mobile phone, a notebook computer, a tablet computer, etc. The card holder includes a card holder body and a plurality of inlaid pieces each pivotally mounted on the card holder body. According to a type of a card to be used in the mobile terminal, ones of the plurality of inlaid pieces at predetermined locations are rotated to a first position perpendicular to a support plane of the card holder body, and remaining ones of the plurality of inlaid pieces are rotated to a second position not higher than the support plane. In this way, the card for the mobile terminal can be fixed by the ones of the inlaid pieces to the card holder body. The card holder is adaptable to cards with different sizes, thereby improving convenience for using the mobile terminal.

FIGS. 1*a* and 1*b*, 2*a* and 2*b*, and 3*a* and 3*b* show external views of a card holder 100 for use in a mobile terminal, according to exemplary embodiments. For example, the mobile terminal may be a mobile phone, a notebook, a tablet computer, etc. The card holder 100 is used to hold a card 14 in the mobile terminal, such as a micro subscriber identity module (SIM) card (FIGS. 1*a* and 1*b*), a mini SIM card (FIGS. 2*a* and 2*b*), a nano SIM card (FIGS. 3*a* and 3*b*), etc. Referring to FIGS. 1*a* and 1*b*, 2*a* and 2*b*, and 3*a* and 3*b*, the card holder 100 includes a card holder body 11 and a plurality of inlaid pieces 13.

In exemplary embodiments, the card holder body 11 provides a support plane 12 for supporting the card 14. The plurality of inlaid pieces 13 are each pivotally mounted on the card holder body 11, and may be rotated to a first position perpendicular to the support plane 12 or a second position not higher than the support plane 12. As a result, the card 14 can be fixed to the card holder body 11 by one or more of the inlaid pieces 13 that are rotated to the first position, e.g., as shown in FIGS. 1*a* and 1*b* and FIGS. 3*a* and 3*b*.

There is no limitation to a number of the inlaid pieces 13 in the card holder 100, so long as various types of the card 14 can be fixed to the card holder body 11. In one exemplary embodiment, shown in FIGS. 1*a* and 1*b*, a user needs to use a micro SIM card in the mobile terminal. Accordingly, eight of the plurality of inlaid pieces 13 at predetermined locations are rotated to the first position to fix the micro SIM card, and remaining ones of the plurality of inlaid pieces 13 are at the second position not higher than the support plane 12. In one exemplary embodiment, shown in FIGS. 3*a* and 3*b*, the user needs to use a nano SIM card. Accordingly, four of the plurality of inlaid pieces 13 at predetermined locations are rotated to the first position to fix the nano SIM card, and remaining ones of the plurality of inlaid pieces 13 are at the second position not higher than the support plane 12.

In the illustrated embodiments, the plurality of inlaid pieces 13 are each pivotally mounted on the card holder body 11. According to a type of the card 14 for the mobile terminal, ones of the plurality of inlaid pieces 13 at predetermined locations are rotated to the first position perpendicular to the support plane 12, and remaining ones of the plurality of the inlaid pieces 13 are rotated to the second position not higher than the support plane 12. In this way, the card 14 for the mobile terminal may be fixed to the card holder body 11 by the ones of the inlaid pieces 13 rotated to the first position. Accordingly, the card holder 100 can adapt to various types of the card 14 with different sizes, which improves matching between the card holder 100 and the card 14, and increases convenience for using the mobile terminal.

Figure 2A:
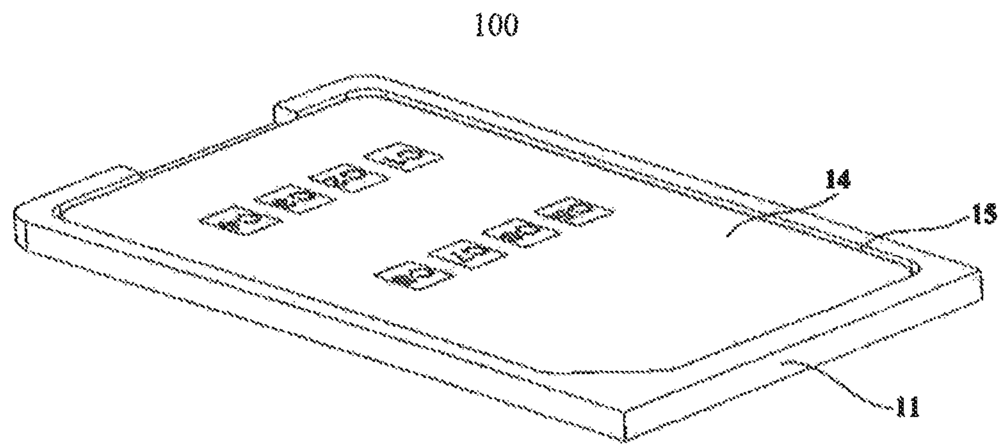
Figure 2B:
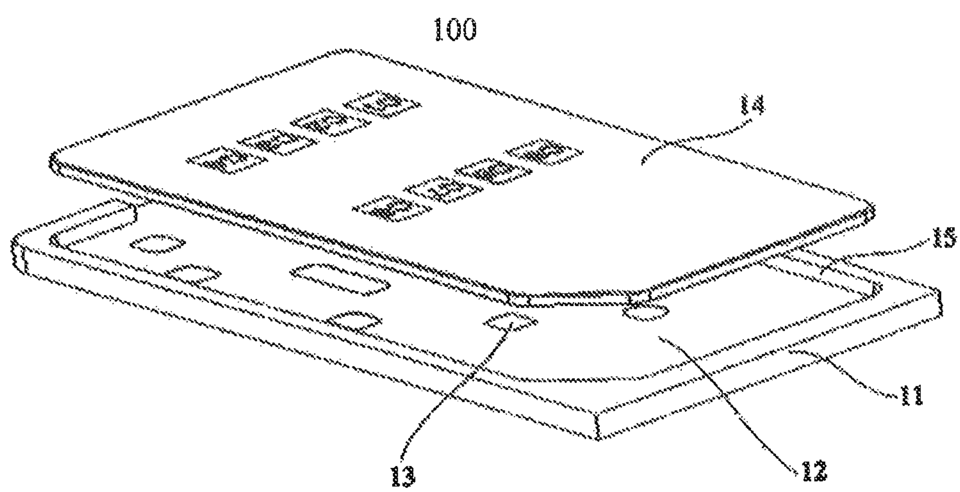
Figure 3A:
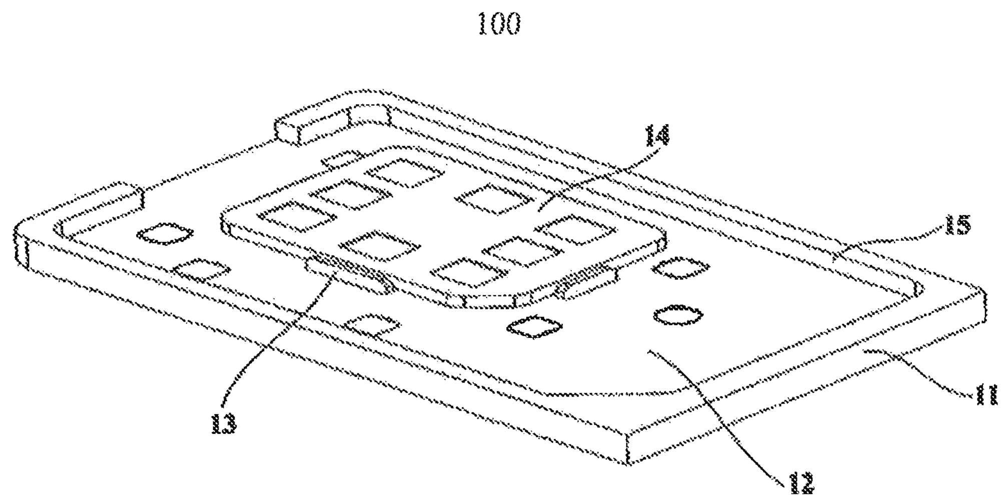
Figure 3B:
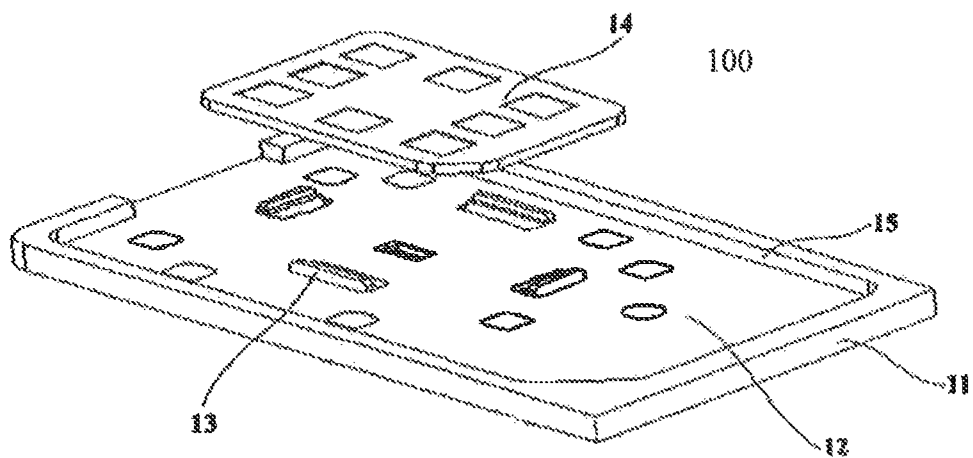

In exemplary embodiments, the card holder body 11 includes a block wall 15 at the periphery of the support plane 12. The block wall 15 may fix the card 14 with a certain size, for example, a mini SIM card, to the card holder body 11, thereby further increasing the types of the card 14 which can match the card holder 100, and further improving convenience for using the mobile terminal. FIGS. 2*a* and 2*b* show external views of the card holder 100 when the block wall 15 is used to fix the card 14 (a mini SIM card) to the card holder body 11, according to an exemplary embodiment. In the embodiment, the plurality of inlaid pieces 13 are all rotated to the second position not higher than the support plane 12.

Figure 4:
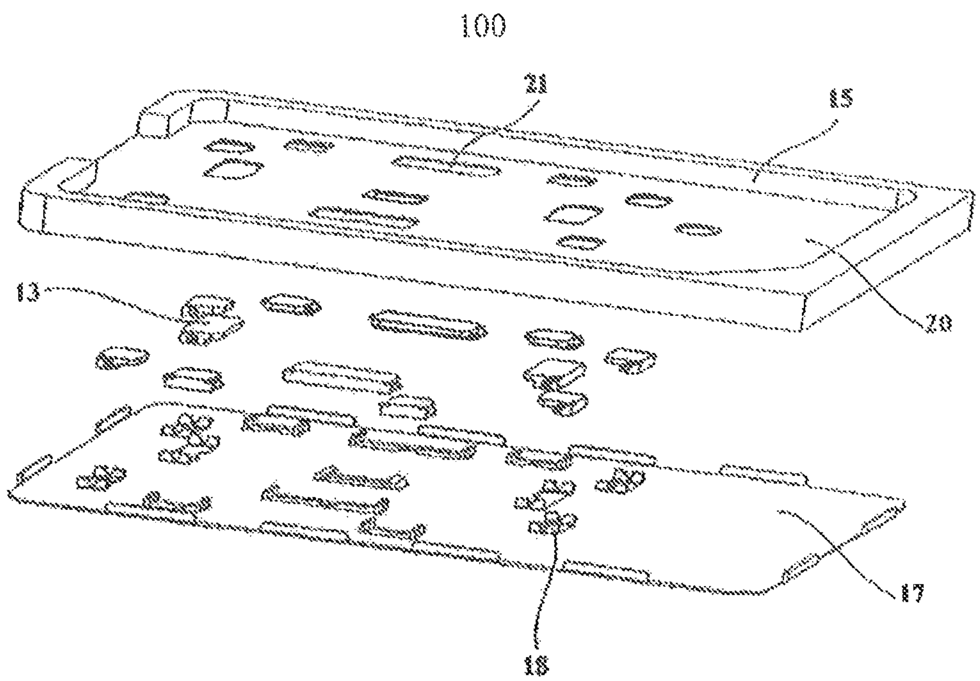
FIG. 4 shows an exploded view of a card holder, according to an exemplary embodiment.

In exemplary embodiments, the card holder body 11 may have an integrated structure or an assembled structure, FIG. 4 shows an exploded view of the card holder 100, according to an exemplary embodiment. Referring to FIG. 4, the card holder body 11 includes an inlaid piece fixing plate 17 and a support plate 20 that provides the support plane 12.

In exemplary embodiments, the inlaid piece fixing plate 17 provides a plurality of inlaid piece holders 18 for the plurality of inlaid pieces 13, respectively. For example, the plurality of inlaid pieces 13 are each pivotally mounted on a corresponding inlaid piece holder 18 with a pin shaft (not shown).

In exemplary embodiments, the support plate 20 is fixed on the inlaid piece fixing plate 17, and provides a plurality of holes 21 each for one inlaid piece 13 to extend out of the corresponding hole 21 when the inlaid piece 13 is rotated to the first position perpendicular to the plane 12, or to be in the corresponding hole 21 when the inlaid piece 13 is rotated to the second position.

Figure 5A:
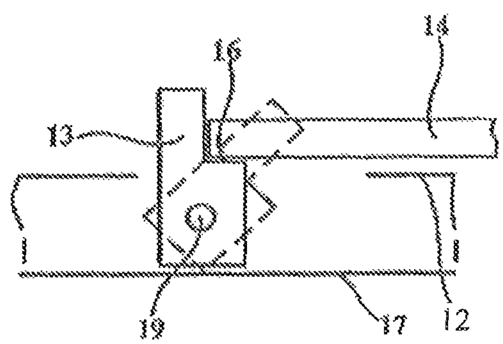
FIGS. 5*a* and 5*b* are schematic diagrams of a first inlaid piece in a first position and a second inlaid piece in a second position, respectively, according to an exemplary embodiment.
Figure 5B:
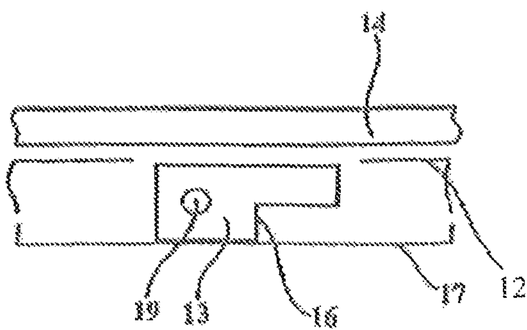

FIGS. 5*a* and 5*b* are schematic diagrams of a first inlaid piece 13 in the first position and a second inlaid piece 13 in the second position, respectively, according to an exemplary embodiment. Referring to FIGS. 5*a* and 5*b*, the first inlaid piece 13 is rotated to the first position perpendicular to the support plane 12 via a first pin shaft 19, and the second inlaid piece 13 is rotated to the second position not higher than the support plane 12 via a second pin shaft 19. There is no limitation on a shape of each inlaid piece 13. In the illustrated embodiment, each inlaid piece 13 includes a part 16 having a step shape. The card 14 for the mobile terminal can be fixed by the parts 16 of those inlaid pieces 13 rotated to the first position. The card 14 for the mobile terminal may be also fixed in a space formed by those inlaid pieces 13 rotated to the first position and the support plane 12.

Figure 6A:
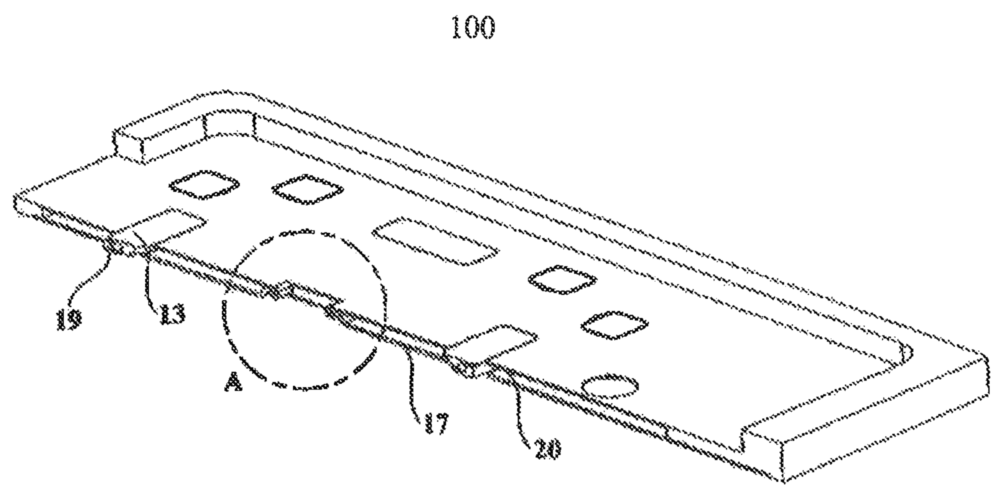
FIG. 6*a* shows a cross-sectional view of a card holder, according to an exemplary embodiment.

FIG. 6*a* shows a cross-sectional view of the card holder 100, according to an exemplary embodiment. Referring to FIG. 6*a*, in the illustrated embodiment, a gap is provided between the inlaid piece fixing plate 17 and the support plate 20. Alternatively, a non-gap design may be taken, as long as each inlaid piece 13 can be rotated to the first position, extended out of the corresponding hole 21, or rotated to the second position, and located in the hole 21, that is, the inlaid piece 13 is not higher than the support plane 12.

Figure 6B:
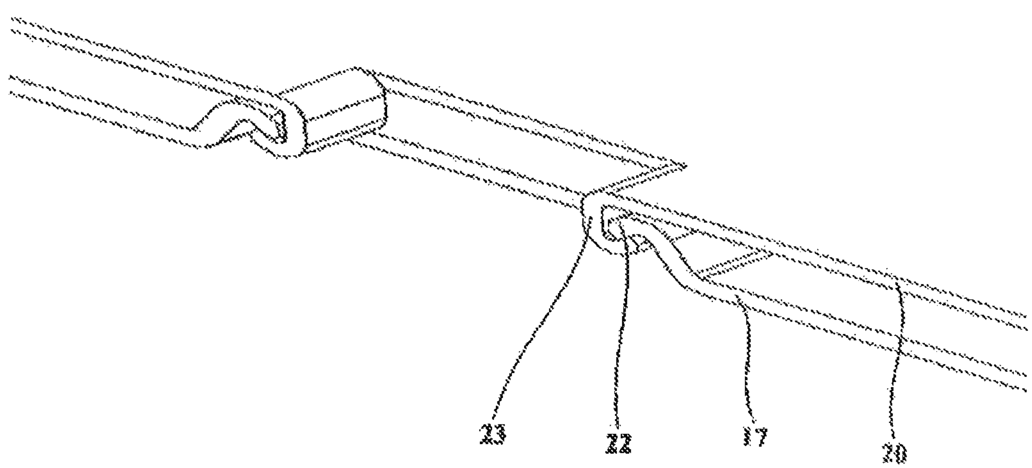
FIG. 6*b* shows an enlarged view of a portion A of the card holder in FIG. 6*a*, according to an exemplary embodiment.

In exemplary embodiments, the inlaid piece fixing plate 17 and the support plate 20 are each a thin plate. As a result, the card holder 100 has a small total thickness. There is no limitation to the fixed form between the inlaid piece fixing plate 17 and the support plate 20. FIG. 6*b* is an enlarged view of a portion A, indicated by a dotted circle, of the card holder 100 in FIG. 6*a*, according to an exemplary embodiment. Referring to FIGS. 6*a* and 6*b*, the inlaid piece fixing plate 17 includes at least a pair of first lock hooks 22 opposite to each other. For each pair of first lock hooks 22, the support plate 20 includes a pair of second lock hooks 23 for hooking with the pair of first lock hooks 22, respectively.

In the illustrated embodiment, the pair of first lock hooks 22 are provided opposite to each other. The pair of first lock hooks 22 may be arranged face to face with each other or arranged offset with each other, however, the facing directions of the pair of first hooks 22 should be arranged in an opposite way, as long as the inlaid piece fixing plate 17 and the support plate 20 can be fixed by a self-locking structure. This makes assembling the card holder body 11 convenient, the weight of the card holder body 11 light, and the fixation of the inlaid piece fixing plate 17 and the support plate 20 to each other stable and reliable, and also keeps thin a whole depth of the card holder 100.

Figure 7:
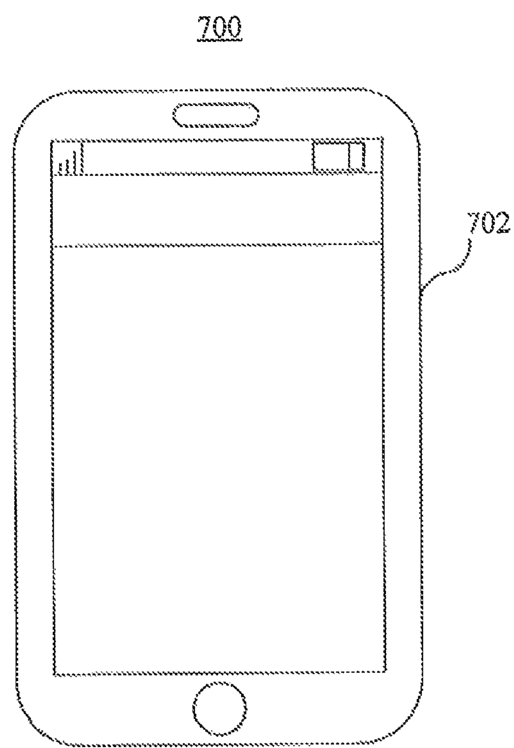
FIG. 7 is a diagram of a mobile terminal, according to an exemplary embodiment.

FIG. 7 is a block diagram of a mobile terminal 700, according to an exemplary embodiment. Referring to FIG. 7, the mobile terminal 700 includes a housing 702 and a card holder (not shown), such as the card holder 100, in the housing 702. Various types of cards, such as a SIM card, may be used in the mobile terminal 700.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A card holder for holding a card, comprising:

A card holder body for providing a support plane for supporting the card; and

A plurality of inlaid pieces, wherein each of the plurality of inlaid pieces is pivotally mounted on the card holder body, is structured to be rotated to a first position perpendicular to the support plane to hold the card or a second position not higher than the support plane, and is structured to be rotated between the first and second positions.

2. The card holder according to claim 1, wherein the card holder body includes a block wall at a periphery of the support plane.

3. The card holder according to claim 1, wherein each of the plurality of inlaid pieces includes a part having a step shape, and ones of the plurality of the inlaid pieces are rotated to the first position to fix the card to the card holder body.

4. The card holder according claim 1, wherein the card holder body comprises:

an inlaid piece fixing plate providing a plurality of inlaid piece holders for the plurality of inlaid pieces, respectively, the plurality of inlaid pieces being pivotally mounted on a corresponding inlaid piece holder with a pin shaft; and a support plate, fixed to the inlaid piece fixing plate, for providing a plurality of holes for the plurality of inlaid pieces, respectively, for each of the plurality of inlaid pieces to extend out of a corresponding one of the holes when the inlaid piece is rotated to the first position, and to be in the corresponding hole when the inlaid piece is rotated to the second position.

5. The card holder according to claim 4, wherein the inlaid piece fixing plate includes at least a pair of first lock hooks opposite to each other, and the support plate includes a pair of second lock hooks for hooking with the pair of first lock hooks, respectively.

6. The card holder according to claim 1, wherein when the card is a micro subscriber identity module (SIM) card to be used in a mobile terminal, a first plurality of the inlaid pieces are rotated to the first position to fix the micro SIM card to the card holder body; and when the card is a nano SIM card to be used in the mobile terminal, a second plurality of the inlaid pieces are rotated to the first position to fix the nano SIM card to the card holder body.

7. The card holder according to claim 2, wherein when the card is a mini subscriber identity module (SIM) card to be used in a mobile terminal, all of the plurality of inlaid pieces are rotated to the second position, for the block wall to fix the mini SIM card to the card holder body.

8. A mobile terminal, comprising:

A housing; and

A card holder in the hosuing, wherein the card holder includes;

A card holder body for providing a support plane for supporting a card; and

A plurality of inlaid pieces, wherein each of the plurality of inlaid pieces is pivotally mounted on the card holder body, is structured to be rotated to a first position perpendicular to the support plane to hold the card or a second position not higher than the support plane, and is structured to be rotated between the first and second positions.

9. The mobile terminal according to claim 8, wherein the card holder body includes a block wall at a periphery of the support plane.

10. The mobile terminal according to claim 8, wherein each of the plurality of inlaid pieces includes a part having a step shape, and ones of the plurality of the inlaid pieces are rotated to the first position to fix the card to the card holder body.

11. The mobile terminal according to claim 8, wherein the card holder body comprises:

an inlaid piece fixing plate providing a plurality of inlaid piece holders for the plurality of inlaid pieces, respectively, the plurality of inlaid pieces being pivotally mounted on a corresponding inlaid piece holder with a pin shaft; and a support plate, fixed to the inlaid piece fixing plate, for providing a plurality of holes for the plurality of inlaid pieces, respectively, for each of the plurality of inlaid pieces to extend out of a corresponding one of the holes when the inlaid piece is rotated to the first position, and to be in the corresponding hole when the inlaid piece is rotated to the second position.

12. The mobile terminal according to claim 11, wherein the inlaid piece fixing plate includes at least a pair of first lock hooks opposite to each other, and the support plate includes a pair of second lock hooks for hooking with the pair of first lock hooks, respectively.

13. The mobile terminal according to claim 8, wherein when the card is a micro subscriber identity module (SIM) card to be used in the mobile terminal, a first plurality of the inlaid pieces are rotated to the first position to fix the micro SIM card to the card holder body; and when the card is a nano SIM card to be used in the mobile terminal, a second plurality of the inlaid pieces are rotated to the first position to fix the nano SIM card to the card holder body.

14. The mobile terminal according to claim 9, wherein when the card is a mini subscriber identity module (SIM) card to be used in the mobile terminal, all of the plurality of inlaid pieces are rotated to the second position, for the block wall to fix the mini SIM card to the card holder body.

15. The mobile terminal according to claim 8, being one of a mobile phone, a notebook computer, and a tablet computer.

* * * * *